Patented July 5, 1949

2,475,273

UNITED STATES PATENT OFFICE 2,475,273

POLYALLYL LEVULINATE

David E. Adelson and Hans Dannenberg, Berkeley, Calif., assignors to Shell Development Company, San Francisco, Calif., a corporation of Delaware No Drawing. Application June 3, 1946, Serial No. 674,040

3 Claims. (Cl. 260—17)

This invention relates to a class of useful new polymers and to a method for manufacturing them. More particularly, the invention pertains to polyallyl esters of saturated ketone monocarboxylic acids.

Diallyl esters of dicarboxylic acids can be subjected to polymerization treatment whereby polymers of the esters are obtained. However, monomers of such esters contain two polymerizable unsaturated groups, i. e. two allyl groups, and consequently, they polymerize to form three dimensional cross-linked polymers which are characterized by being insoluble in all solvents as well as being infusible. These insoluble and infusible polymers have no utility in applications where further processing of the polymer is desired because of the inability to dissolve them in solvents and subject them to further reaction treatment. On the other hand, compounds which contain but a single polymerizable unsaturated group do not form three dimensional cross-linked polymers upon being polymerized; rather, they form only linear polymers which are characterized by being soluble in a variety of common solvents as well as being fusible, i. e. capable of being melted when heated. The properties of solubility and fusibility possessed by linear polymers of the compounds containing only a single polymerizable unsaturated group enable them to be subjected to further treatment and reaction so as to produce highly useful products. Moreover, the linear polymers are useful within themselves without further treatment owing to their properties of solubility and fusibility.

Allyl esters are extremely resistant to polymerization treatment in comparison with other compounds containing a polymerizable unsaturated group. For example, vinyl acetate will form a polymer upon addition of a polymerization catalyst like benzoyl peroxide in a short time even at room temperature (20° C.). The corresponding allyl ester, i. e. allyl acetate, can have benzoyl peroxide added thereto and permitted to remain at room temperature for practically indefinite periods of time without appreciable polymerization occurring. In our copending application, Serial No. 417,278, filed October 31, 1941, now abandoned of which the present application is a continuation-in-part, we have described a method whereby polymerization of allyl acetate and similar singly unsaturated compounds can be effected. As disclosed therein, we discovered that by heating liquid allyl acetate for rather extended periods of time at elevated temperatures of 50° C. to 250° C. in the presence of peroxides or gases containing oxygen, polymerization of the allyl acetate occurred and polyallyl acetate was produced. Besides being catalysts which are capable of effecting the polymerization reaction, the substances used in the treatment such as benzoyl peroxide or air, are also known to be powerful oxidizing agents. A compound like allyl acetate is not particularly susceptible to oxidation owing to its stable chemical structure and treatment of it at elevated temperature in the presence of a peroxide or gaseous oxygen should not, and in fact does not, cause oxidation thereof, at least to any appreciable extent. The situation is quite different with respect to allyl esters of saturated ketone monocarboxylic acids of which allyl levulinate is typical. Allyl levulinate contains a keto group and the compound is therefore quite susceptible to oxidation owing to the presence of this labile keto group. Treatment of allyl levulinate with oxidizing agents like peroxides or air, especially at elevated temperatures, should cause oxidation of the compound to occur with splitting or decomposition at the point where the labile keto group is situated. It was therefore entirely unexpected when we discovered that allyl levulinate could be heated at elevated temperatures in the presence of benzoyl peroxide or air and polyallyl levulinate produced with no material oxidation of the compound having occurred.

The polymeric esters of the ketone-substituted fatty acids of the invention are very valuable materials. The presence of the keto group in the monomer units of the polymer macromolecules gives the polymers of the invention unexpected and unobvious properties in comparison with the properties of polymers from the corresponding esters of unsubstituted fatty acids. Furthermore, the keto groups in the polymer permit useful reactions and further treatment of the polymers not possible if the keto groups were absent. For example, treatment of the soluble polymers wtih bases, e. g. sodium hydroxide, causes condensation reactions to occur so that the polymer is converted to an insoluble polymeric resin. Similarly, the polymer can be insolubilized and infusibilized by condensation with formaldehyde in the presence of bases, or by reaction with diamines like ethylene diamine, or by reaction with polyhydric alcohols such as ethylene glycol to form complex ketals. The polymers are particularly reactive when the keto group constitutes the alpha or beta carbon atom of the substituted fatty acid. The polymers from allyl esters of beta-keto fatty acids are unique in having acidic properties and the ability to act as ion-exchange materials. When it is desired to have more stable and less reactive polymers, esters of acids having keto group in the gamma or a more removed position from the carboxyl group are used. Preferably, the compounds polymerized in the process of the present invention are allyl esters of saturated aliphatic monocarboxylic acids of 3 to 6 carbon atoms containing a single ketone group therein as is the case with allyl esters of such acids as, for example, pyruvic, propionyl formic, butyryl formic, dimethyl pyroracemic, trimethyl pyroracemic, acetoacetic, methyl acetoacetic, propyl acetoacetic, diethyl acetoacetic, propionyl acetic, levulinic, beta-methyl levulinic, delta-methyl levulinic, gamma-acetobutyric, and the like. If desired, there can be polymerized allyl esters of higher monoketo acids like isobutyl pyroracemic, butyryl isobutyric, decanoyl acetic, mesitonic, beta, delta-dimethyl levulinic, caproyl isobutyric, gamma-ethyl-gamma-acetobutyric, gamma-butyrobutyric, beta-isopropyl - delta - acetovaleric, beta-methyl-delta-isobutyrovaleric, undecanonic, 8-ketostearic, 9-ketostearic and the like together with their homologues. Although, it is preferred to polymerize the esters of monoketo acids, allyl esters of polyketo acids can be used, if desired, including esters of such representative acids as acetyl glyoxylic, 9,10-diketostearic, 13,14-diketobehenic, 9,12-diketostearic, acetyl pyroracemic, butyryl pyroracemic, caproyl acetoacetic, acetonyl acetoacetic, acetonyl lebulenic, alpha, beta, gamma-triketo-n-valeric, pyruvyl pyruvic, alpha, gamma-diacetyl acetoacetic and the like.

These allyl esters polymerize at a reasonably rapid rate in the process of the invention. However, the corresponding esters of other unsaturated alcohols of the same type can also be used although polymerization of them, in general, is slower and more difficult. These alcohols are monoolefinic monohydric compounds, all of which contain the aliphatic olefinic double-bonded linkage between the second and third carbon atoms from the oxygen atom of the hydroxy group therein. In other words, the alcohols have an olefinic linkage between two aliphatic carbon atoms one of which is directly linked to the saturated carbon atom having the hydroxy group linked directly thereto. These alcohols can be either primary, secondary or tertiary alcohols and they contain 3 to 10 carbon atoms. The alcohols may also be termed beta, gamma-monoolefinic monohydric alcohols in that they contain the aliphatic olefinic linkage between the beta and gamma carbon atoms with respect to the alpha carbon atoms to which the hydroxy group is directly linked. Of the generic class of alcohols employed in the form of their esters with the ketone substituted acids, it is preferred that the gamma or third carbon atom from the oxygen atom of the hydroxy group be the carbon atom of a terminal methylene group. As is the case in such representative alcohols as allyl, methallyl, beta-ethallyl, methyl vinyl carbinyl, ethyl vinyl carbinyl, dimethyl vinyl carbinyl, beta-isopropyl allyl, beta-hexyl allyl, pentyl vinyl carbinyl, phenyl vinyl carbinyl, beta-phenyl allyl, tolyl vinyl carbinyl, beta-cyclohexyl allyl, and the like. If desired, the esters of other less preferred alcohols of the class can be used such as, for example, crotyl alcohol, tiglyl alcohol, angelyl alcohol, cinnamyl alcohol, hexen-2-ol-1, octen-2-ol-1, decen-2-ol-1, hexen-3-ol-2, hexen-4-ol-3, cyclohexen-2-ol-1, and the like. Esters of the aliphatic unsaturated alcohols are most desirable, but those containing aryl and/or alicyclic radicals, e. g. tolyl, cyclohexyl and cyclopentyl, as additional substituents can also be used. If desired, the esters of halogen substituted alcohols can also be employed such as beta-chlorallyl alcohol, gamma-chlorallyl alcohol, beta-bromallyl alcohol, chlorocrotyl alcohol, 3-chlorobuten-2-ol-1 and the like.

The esters polymerized by the process of the invention are prepared by conventional methods in the same manner that the corresponding saturated esters of the ketonic acids are produced. For example, allyl levulinate is obtained by esterifying levulinic acid with allyl alcohol in the presence of 85% phosphoric acid while using benzene as azeotropic agent to remove the water of reaction by distillation from the reaction mixture. Allyl pyruvate is obtained by reacting acetyl cyanide with allyl alcohol in the presence of sulfuric acid in conventional manner or by treating allyl lactate with a mild oxidizing agent. Allyl acetoacetate is prepared by the Claisen reaction from allyl acetate. Since some unsaturated alcohols which contain an unsaturated tertiary carbon atom tend to rearrange in strong acid medium, as is the case with methallyl alcohol which rearranges to isobutyraldehyde, an indirect method of synthesis may be necessary with such alcohols whereby the methyl ester of the ketonic acid is first prepared and this compound is then subjected to the ester exchange reaction with the unsaturated alcohol. Thus methallyl levulinate can be prepared by reacting methyl levulinate with methallyl alcohol in the presence of sodium alcoholate as catalyst and the methyl alcohol liberated in the reaction removed during its course by distillation.

In order to obtain the linear polymers of the invention, the unsaturated esters are heated in the presence of an oxygen-containing polymerization catalyst. Gases which contain oxygen such as air can be used for this purpose or, if desired, substantially pure oxygen is suitable as well as oxygen in admixture with diluents like nitrogen, carbon dioxide or methane. Peroxide polymerization catalysts are very suitable such as benzoyl peroxide, hydrogen peroxide, barium peroxide, sodium peroxide, olefin peroxide, lauryl peroxide, benzoyl acetyl peroxide, acetone peroxide, etc. Tertiary alkyl peroxides are particularly preferred in view of their high catalytic activity and these peroxides include such compounds as, for example, tert-butyl hydroperoxide, di-tert-butyl peroxide, and tert-butyl perbenzoate. Other oxygen-yielding compounds can be employed as catalysts such as an alkali metal persulfate or perborate. All of these oxygen-containing catalysts used in the process of the invention have an oxygen atom linked directly to another oxygen atom.

Elevated temperatures are necessary in order to effect the desired polymerization. The ester in the presence of the polymerization catalyst is heated at 50° C. to 250° C. and in some cases up to 300° C. or even higher. However, temperatures so high that appreciable decomposition of the ester or its polymer are, of course, to be avoided. The rate of polymerization at lower temperatures such as from 50° C. to 100° C. are comparatively slow although with catalysts like benzoyl peroxide which are subject to extensive decomposition at higher temperatures, it is desirable to employ a temperature within this lower range. The tertiary alkyl peroxides are quite stable at such higher temperatures and by employing a range of say 100° C. to 250° C., 150° C. to 200° C. being particularly suitable with a catalyst of this type, e. g. di-tert-butyl peroxide, the polymerization can be effected at a quite rapid rate. The concentration of catalyst can be varied over considerable limits and it seems in general larger amounts of catalyst give faster rates of polymerization. However, this effect is to some extent limited because above about 10%, the increase in rate with increased catalyst concentration is not so marked as at lower amounts of the oxygen-yielding compounds. The use of excessive amounts of polymerization catalyst is accordingly uneconomical. In general, the use of about 0.1 to 5% polymerization catalyst is suitable and about 1 to 2% is preferred. To effect the addition polymerization reaction, the oxygen-containing catalyst is, of course, the sole catalytic agent present in the polymerization mixture. The polymerization appears to occur in the liquid phase and the pressure of operation is therefore regulated in conjunction with the temperature so that at least part of the ester is in liquid phase, i. e. where necessary sufficiently high pressure is employed so that all or part of the ester is maintained in liquid phase. With peroxide catalysts like benzoyl peroxide, which are subject to considerable decomposition at temperatures above 100° C., the polymerization can be effected by adding additional catalyst from time to time or continuously in order that the polymerizing ester will always have the polymerization catalyst present. If desired, of course, the temperature may be maintained below that at which appreciable decomposition of the catalyst occurs. In any event, it is essential that the catalyst be present with liquid reactant to enable the polymerization to proceed at least at an appreciable rate.

As noted the polymerization may be effected in the presence of a molecular oxygen-containing gas. When such a gas is employed as catalyst it is ordinarily desirable to operate at temperatures from about 100° C. to 200° C. In this case, the ester is heated and a molecular oxygen-containing gas such as air is brought into intimate contact with the liquid ester as by dispersing the gas into and through the reaction in the form of fine bubbles.

The process of the invention may be executed in a variety of manners. In general it is preferable to conduct the polymerization in a closed vessel equipped with heating means. When a non-gaseous catalyst is employed, the catalyst is mixed with the ester and the mixture is heated for a time sufficient to effect the appreciable polymerization of the ester. In cases where a gaseous catalyst is used, the gas is bubbled or dispersed through the heated liquid ester and is recycled through the ester, or if desired, discharged to the atmosphere. It is usually desirable in discharging gaseous catalyst, to provide passage of the gas through some recovery means such as a condenser in order to remove ester which is carried with the gas as vapor. The time required to effect the polymerization will vary to considerable extent depending upon the particular ester, the catalyst and the temperature of operation. It has been found in polymerizing the esters that the rate of polymerization is fairly rapid at first but, as the monomeric ester is diluted with polymer, the rate decreases. In general, the polymerization is conducted for a time sufficient to effect appreciable polymerization, i. e. until at least 10% of the ester has been converted to polymer.

The time necessary to convert a given proportion of polymer will vary considerably with the particular ester, the catalyst and its concentration, the temperature and other reaction variables. The time required to obtain a desired proportion is readily determined by trial under the chosen reaction conditions wherein samples are withdrawn and the refractive index thereof measured along with a rapid distillation of the sample under vacuum of 1 to 2 mm. to remove monomer and determine the polymer content thereof. Since the refractive index of the monomer-polymer mixture increases with increasing polymer content, a correlation can be made between time of treatment, refractive index and the conversion to polymer. By use of the correlation, the time necessary for a desired conversion can be predicted or by measuring the refractive index of a polymerizing ester, the polymer content can be estimated. While it is usually preferable to use substantially pure ester, it may in some cases be desirable to effect the polymerization in an inert solvent, especially in those cases where the ester is a solid material at the temperature of operation. Various hydrocarbons are particularly suited for this purpose such as a benzene, toluene, naphtha and the like. Many of the esters are high boiling liquids and they can be polymerized at normal atmospheric temperature by refluxing in the presence of the polymerization catalyst.

In polymerizing the esters the polymerization reaction is ordinarily stopped before all the monomer has been converted to polymer. The unreacted monomer is then recovered from the reaction mixture, preferably by distillation or evaporation. Other methods, such as extraction or the like, can be used to separate the monomer from the polymer. The recovered unreacted monomer may be re-utilized in further polymerization operations.

For the purpose of illustrating in some detail the application of the invention as described above, the following examples are given, although it is to be understood that these are in no way to be construed as limiting the invention with respect to reactants, catalysts or mode of operation.

Example I

Allyl levulinate was polymerized by heating at 125° C. to 130° C. while bubbling air through it at a rate of about 5 small bubbles per minute. Polymerization was evident from the increasing viscosity of the mass during the treatment and the increase in refractive index which was as follows:

| Time, hours | Refractive Index, 20/D |
|---|---|
| 0 | 1.4420 |
| 72 | 1.4735 |
| 121 | 1.4792 |
| 140 | 1.4828 |
| 162 | 1.4843 |

The final product was a very viscous oil, substantially all of which consisted of polyallyl levulinate.

Example II

Allyl levulinate was polymerized by heating at about 220° C. in the presence of 2% of di-tertbutyl peroxide for 45 minutes. In this time, the refractive index (20/D) increased from 1.4417 to 1.4742. The viscous monomer-polymer mixture was distilled rapidly from a Claisen flask, first removing the bulk of the monomer at atmospheric pressure and then reducing the pressure to 1-2 mm. to remove the remainder of the monomer. The distillation showed that about 78% of the monomer was converted to polyallyl levulinate. The polymer was a nearly water-white, very viscous material. The analysis given below indicates it had a polymerization degree of about 6.5 from the molecular weight determination made ebulliscopically in toluene.

|  | Found | Theoretical |
|---|---|---|
| Refractive index, 20/D | 1.4843 |  |
| Color, Gardner | 2 |  |
| Viscosity, Gardner-Holdt | $Z_3-Z_4$ |  |
| Ester value, equiv. per 100 g | 0.651 | 0.641 |
| Carbonyl value, equiv. per 100 g | 0.625 | 0.641 |
| Acid value, equiv. per 100 g | 0.001 | 0.000 |
| Molecular weight | 1010 | $(156)_n$ |

Polyallyl levulinate in common with other polymers of the invention is unexpectedly versatile as a plasticizer for resins in comparison with polyallyl esters of unsubstituted saturated fatty acids. Compositions prepared by milling polyallyl levulinate into polyvinyl chloride gave flexible homogeneous compositions when either 40 parts or 80 parts of polyallyl levulinate per 100 parts of resin was used. On the other hand, polyallyl acetate could not be milled into polyvinyl chloride in either proportion so that a homogeneous composition was obtained since it was found that polyallyl acetate is incompatible with polyvinyl chloride. Moreover, it was discovered that 40 or 80 parts of polyallyl levulinate could be milled into 100 parts of cellulose acetate to give homogeneous plastic compositions which are excellent for manufacture of plastic articles by molding operations used in the resin industry. This was unexpected and showed an unobvious property of polymers of the invention since both polyallyl propionate and polyallyl butyrate are so incompatible with cellulose acetate that homogeneous compositions cannot be prepared from either polymer and the cellulose ester.

In its broad aspects our invention is concerned with polymerization of and polymers from allyl and related unsaturated alcohol esters of a saturated ketomonocarboxylic acid. Furthermore, the ester contains but a single polymerizable group having a multiple linkage between two vicinal aliphatic carbon atoms and this is the only group present in the ester capable of addition polymerization, it being located in the alcohol portion of the compound. This lack of plurality of such polymerizable groups enables the desired linear polymers to be obtained by addition polymerization.

The novel linear polymers of the invention are very useful substances. They can be employed as plasticizers and softeners for a variety of plastic materials such as cellulose derivatives, nitrocellulose, cellulose acetate, etc., as well as for synthetic resins like polyvinyl chloride, polyvinyl acetals, and the like. Since they are soluble in various common materials, and since the polymer molecules contain in general about 4 to 20 monomer units, they are particularly useful as intermediates in the synthesis of other synthetic resins as by reaction with formaldehyde, ethylene diamine, polyhydric alcohols or the like.

The foregoing description has emphasized production of homopolymers, i. e. polymerization of the ester as sole polymerizable constituent in the composition which may also contain the catalyst and inert diluents. If desired, copolymers can be prepared from mixtures of the unsaturated esters or from the unsaturated ester in admixture with another compound or compounds containing a polymerizable group such as those containing the $CH_2=C<$ or vinylidene group like in styrene, butadiene-1,3, vinyl acetate, diallyl phthalate, methyl methacrylate, allyl acetate, acrylonitrile, etc.

We claim as our invention:
1. Polyallyl levulinate.
2. A process for producing polyallyl levulinate which comprises heating allyl levulinate at about 130° C. while bubbling air therethrough for sufficient time to convert substantially all of the monomeric allyl ester to polyallyl levulinate.
3. A homogeneous composition comprising 40 to 80 parts of polyallyl levulinate and 100 parts of cellulose acetate.

DAVID E. ADELSON.
HANS DANNENBERG.

REFERENCES CITED

The following references are of record in the file of this patent:

UNITED STATES PATENTS

| Number | Name | Date |
|---|---|---|
| 1,241,738 | Klatte et al. | Oct. 2, 1917 |
| 2,164,188 | Groll et al. | June 27, 1939 |
| 2,321,897 | Britton et al. | June 15, 1943 |
| 2,448,703 | Clifford | Sept. 7, 1948 |